B. R. SMITH.
SOUND REPRODUCING INSTRUMENT.
APPLICATION FILED JUNE 3, 1912.

1,062,369.

Patented May 20, 1913.
4 SHEETS—SHEET 1.

Fig. 1.

Witnesses:
Inventor
Ben R. Smith
By Hirschl & Hirschl
Attys.

B. R. SMITH.
SOUND REPRODUCING INSTRUMENT.
APPLICATION FILED JUNE 3, 1912.

1,062,369.

Patented May 20, 1913
4 SHEETS—SHEET 2.

Witnesses:

Inventor:
Ben R. Smith,
By Hirschl & Hirschl
Attys.

B. R. SMITH.
SOUND REPRODUCING INSTRUMENT.
APPLICATION FILED JUNE 3, 1912.

1,062,369.

Patented May 20, 1913.

UNITED STATES PATENT OFFICE.

BEN R. SMITH, OF CHICAGO, ILLINOIS, ASSIGNOR TO SMITH REPEATOSTOP COMPANY, OF CHICAGO, ILLINOIS, A CORPORATION.

SOUND-REPRODUCING INSTRUMENT.

1,062,369.   Specification of Letters Patent.   Patented May 20, 1913.

Application filed June 3, 1912. Serial No. 701,195.

*To all whom it may concern:*

Be it known that I, BEN R. SMITH, a citizen of the United States, residing at 3922 North Hamilton avenue, Chicago, Illinois, have invented new and useful Improvements in Sound-Reproducing Instruments, of which the following is a specification.

This invention relates to means connected with a sound-reproducing instrument for automatically causing such instrument at the end of a performance to either repeat such performance, or to cease playing.

The invention relates more especially to the type of instrument employing a flat circular disk, hereinafter referred to as a record disk, for recording the impressions of the various selections which are to be reproduced; such type of instrument being more commonly referred to as a graphophone.

The present invention contemplates the employment of an attachment for such an instrument not previously designed for such purpose, and such attachment is adapted for engagement with the moving parts of the instrument in such manner as to automatically accomplish the necessary movements to either cause a repetition of the performance of a selection; or to arrest the operation of the instrument.

The device comprises more particularly an attachment which is designed to engage with the sound-reproducing means, hereinafter referred to as the sound box, in order to raise such sound box from the record disk at the end of its travel over such disk and place it in the proper position for repeating such travel, in the same manner as is ordinarily done by the operator when a repetition of the selection is desired; and in addition, means are provided for engaging with the rotating table or turn table which carries the record disk for braking or arresting the rotation of such table at either the end of the first, second or a pre-determined subsequent performance of the selection, according to a pre-arranged setting of the device.

The device comprises in general terms, a shelf-like member which extends horizontally over the surface of the record disk immediately below the path of travel of the sound box and means operating at the end of a performance of one of such record disks for inclining the shelf by raising its inner end; whereby the sound box is raised from the record disk and is caused to slide (or roll, being provided with a wheel for such purpose) over the surface of the shelf and assume the correct position for a repetition of its travel over the record disk. In such position, according to a pre-arranged setting of the device, the parts may be arrested and maintained; or the shelf may again assume its original horizontal position and allow the sound box to repeat its travel over the record disk and the instrument thereby to continuously repeat its performance of the selection engraved upon such disk as long as it may be actuated by its driving spring or other impelling means with which the instrument may be provided; or the device may be arranged to permit a limited number of repetitions only, after which the braking device is brought into operation to arrest the further performance of the instrument.

A device embodying the principles of the present invention is illustrated in the accompanying drawings in which.

As shown in said drawings the graphophone instrument comprises a box or housing 12, including a horizontal top or cover 15, in which box or housing is arranged the driving mechanism for rotating the sound reproducing disk or record disk. Above the cover 15 is arranged a horizontal, circular, rotating table or turn-table 16, which is fixed to a vertical shaft or spindle 17 passing through such cover. Upon the rotating table is placed the record disk 18 which latter is thereupon rotated in the operation of the device by its frictional engagement with the rotating table. A long, hollow, horizontal arm 20, pivoted upon a bracket member 21, attached to the side of the graphophone housing, carries at its free end a hinged and curved hollow arm 22, supporting the sound-reproducing device or sound box 23; the latter carrying a needle or stylus 24, which engages a spiral groove in the surface of the record disk 18. These parts are shown in the form which they assume in a well known type of graphophone apparatus, and, except as hereinafter specified, their particular construction constitutes no part of the present invention.

Above the table 16 and normally lying parallel therewith is arranged a flat shelf-like member 25, which takes somewhat the form as seen in top plan view of a letter V; being arranged with its closed end over the center of the table 16 and its opposite ends extending beyond the circumference of the same. The latter are bent downward and hinged to the ends of a horseshoe-shaped member or bracket 26, secured to the cover portion 15 of the graphophone box and likewise extending beyond the circumference of such rotating table and upturned at its ends in order to meet the ends of the shelf 25. By this means it will be seen that the inner end of the shelf-like member, being the portion thereof lying above the center of the circular rotating table, is free to rise and fall in the operation of the device, and the purpose of bending its outer ends downward and hinging them upon an axis somewhat below the plane of the shelf is to also cause the inner end of the shelf to move radially with respect to the circular table a greater distance than would be the case if its angular movement were confined to an arc having a vertical tangent at its foot; such radial movement, as will hereinafter be more fully explained, being necessary in the operation of the device. The said shelf 25 and the bracket member 26 are conveniently made of sheet metal and their related ends take the form of hinge leaves, the parts being connected by means of removable pins or loose butts 30, 30. The bracket 26 is conveniently secured to the cover 15 by means of screws 31 passing through holes in such bracket, whereby, after temporarily detaching the table 16 from its spindle, the bracket may be accurately located upon the cover 15 for the shelf 25 to assume its correct position with respect to such spindle.

To the upper end of the shaft 17 is fixed a threaded stud or screw 32, as here shown designed to replace the shorter unthreaded stud ordinarily placed in the center of the rotating table of the type of graphophone here illustrated, said screw being made hollow at its lower end and internally threaded for engagement with the reduced and correspondingly threaded shaft 17. It is desirable that the screw 32 instead of having threads of ordinary form, is made with threads having somewhat the form, as seen in cross section, of upwardly facing saw teeth in order to secure more effective engagement therewith of another part of the device hereinafter described.

Figure 5:
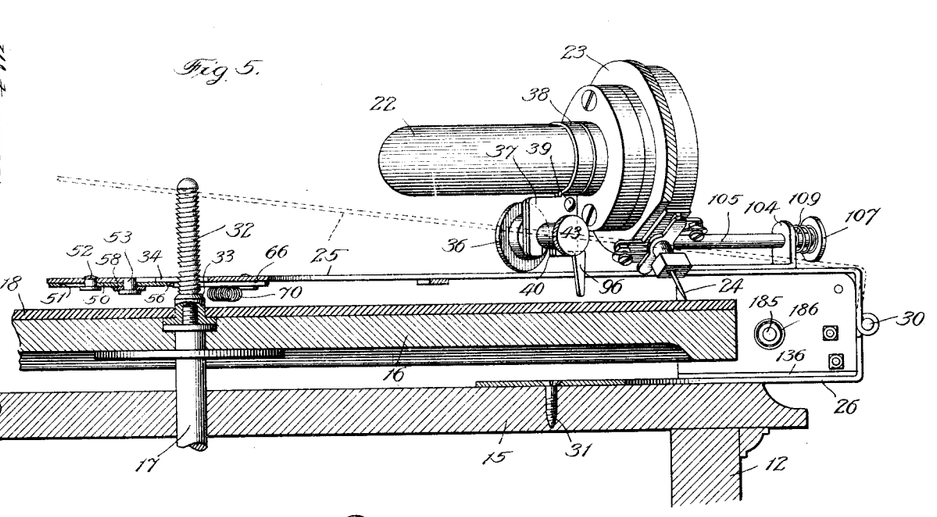
Fig. 5 is a vertical section on the line 5 of Fig. 1.
Figure 6:
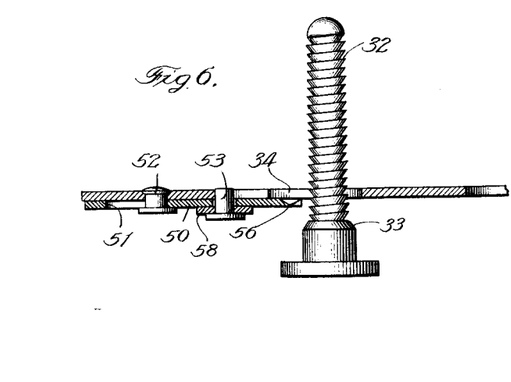
Fig. 6 is a reproduction of a portion of Fig. 5 on a larger scale.
Figure 7:
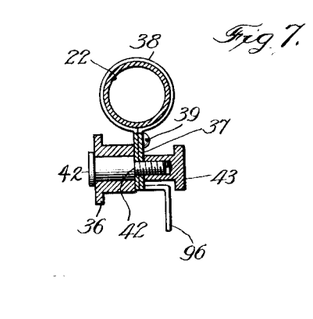
Fig. 7 is a vertical section through the axis of the wheel 36 shown in Fig. 5.

The screw 32 extends through an opening 34 in the shelf 25, which opening is made large enough to permit the shelf to be raised above the top of the screw for the purpose of placing the record disks upon the table, and removing them therefrom. In the normal operation of the graphophone apparatus the shelf 25 occupies a horizontal position as shown in the full lines in Fig. 5, being supported by other parts beneath it, to be hereinafter described, and the sound box 23 in its travel over the record disk remains a small distance above the shelf and free from engagement therewith. When the sound box has reached the end of its travel over the record disk parts carried by the shelf are designed to engage with the screw 32 and by the rotation of the latter to raise said shelf into its inclined position as shown by the dotted lines in Fig. 5; whereupon the latter engages with a small wheel 36 mounted in a bracket member 37 attached to the curved tube 22 adjacent to the sound box, and said sound box is accordingly lifted from the record disk and travels down the inclined surface of the shelf to its initial position at the circumference of the disk. The said bracket member 37 comprises a band 38 which encircles the curved tube 22 at the end of the latter immediately adjacent to the sound box, the ends of such band being secured together by a small bolt 39 and being widened to form a flat plate in the lower margin of which is cut a vertical slot 40. The wheel 36 is mounted upon a shaft 41 having a shoulder 42 near one end and being threaded at the other end to engage with a nut in the form of a thumb screw 43 between which and the shoulder 42, the portions of the plate 37 adjacent to the slot may be clamped; whereby the wheel may be raised or lowered in the bracket in order to accommodate the device to different lengths of needle which may be used in the sound box. According to a pre-arranged setting of the device the parts may remain in such position with the shelf 25 raised and the sound box out of engagement with the record disk, and the braking device may operate to arrest further rotation of the turn table; or the shelf 25 may be again lowered, the sound box replaced in engagement in a record disk and the instrument allowed to repeat its performance one or more times after which the braking device may operate; or the braking device may remain wholly inoperative and the instrument be permitted to repeat its performance an unlimited number of times.

The means whereby the shelf 25 is brought into engagement with the screw 32, in order that the rotation of the latter may raise the inner end of said shelf, comprises a small block 50 arranged below the end of the shelf 25 adjacent the opening 34 and designed to move radially in order to engage with the screw 32, said block having a slot 51 at one end engaging with a pin 52 fixed in the end of the shelf 25 and having near its other end a short pin 53 engaging with a similar slot 54 which constitutes an extension of the opening 34, whereby said block is free to slide toward and from the screw 32; said block having its inner end formed in the shape of a thin concave edge or thread 56 adapted to engage with the threads of the screw 32 when the parts are brought together. The pin 53 also engages with a slot in one arm 58 of a bell crank lever 59 which is pivoted upon the under-side of the shelf, said bell crank lever having a long arm 60 for swinging it about its pivot point 61 and bringing the block 50 into engagement with the screw 32. The bell crank lever 59 is also provided with a slot 63 extending in the direction of an arc described about its pivot point 61, the ends of such slot being designed to engage with a pin 64 fixed in the shelf 25 in order to limit the movement of such bell crank lever.

Figure 1:
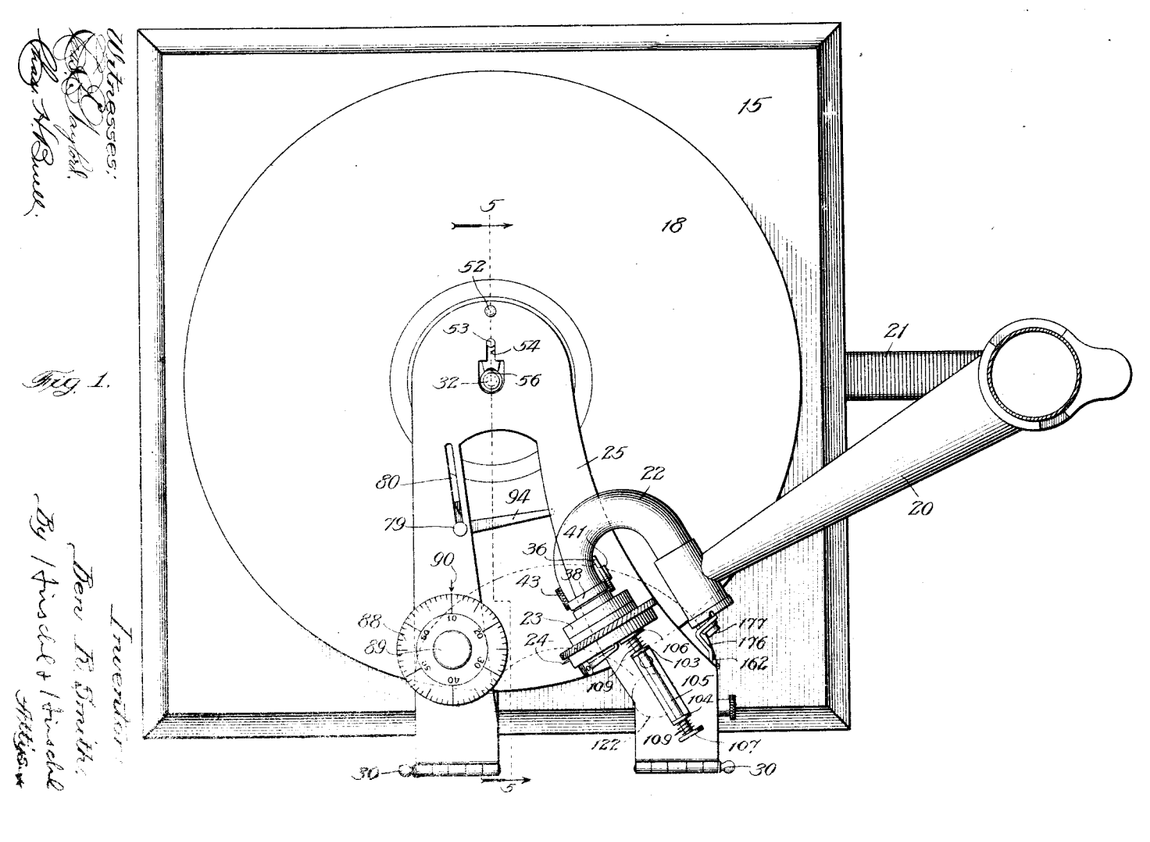
Figure 1 is a top plan view illustrating the device in combination with a sound-reproducing instrument of well known form.
Figures 2, 3, 4:
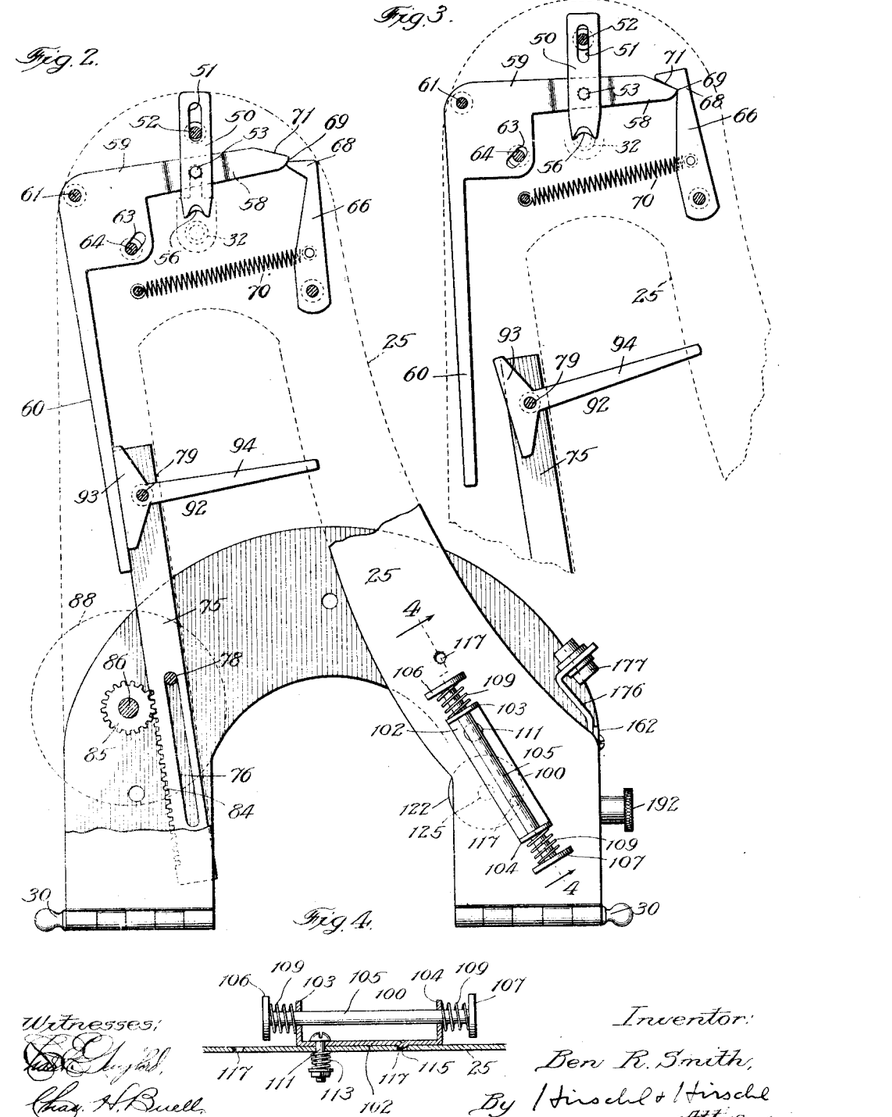
Fig. 2 is a similar view of the device detached from the instrument and with a portion broken away to disclose parts lying beneath.
Fig. 3 is a view similar to Fig. 2, but showing the moving parts in an altered position with relation to each other.
Fig. 4 is a vertical section on the line 4 of Fig. 2.

The bell crank lever 59 is designed to remain normally in the position shown in Fig. 2 with the arm 58 and the block 50 attached thereto withdrawn from the screw 32, and is retained thus by a latch 66, which latch comprises a pivoted lever having at its free end a pointed toe or foot 68 adapted to rest upon the curved or cam-shaped end 69 of the arm 58, the lever 66 being drawn toward the end of such arm by means of a spring 70. It is designed, however, that when the arm 58 has moved a small distance in a direction to slide the block 50 toward the screw, the latch 66 will operate to quickly move it through the rest of its throw and into the position shown in Fig. 3, and will thereupon act to yieldingly retain the block in engagement with the screw until the block is again withdrawn in the further operation of the device, as will be hereinafter described. For this purpose the end of the arm 58 which engages with the pointed toe 68 is correspondingly pointed so that after it has moved a sufficient distance to carry the pointed toe 68 over the highest place on its rounded end it will be quickly thrown the further distance required to complete its movement by the pressure of such pointed toe and the engaging surfaces sliding upon each other; the curved or cam-shaped surface 69 being interrupted by cutting the end of the arm off diagonally to form a beveled or wedge-shaped surface 71. When the block 50 is in its withdrawn position, as shown in Fig. 2, the pointed end of the foot 68 rests upon the curved surface 69 and acts to yieldingly maintain the parts in such position; but when the block has been moved a small distance toward the screw, the foot 68 at the end of the latch lever 66 slides down over the slanting surface 71 to quickly complete the movement of the parts and hold the block and the screw together; the engaging surfaces between the arm 58 and the latch lever however, being arranged at such an angle that a sufficient pressure upon the thin end of the sliding block will force it away from and out of engagement with the screw 32, such withdrawing movement of the sliding bolt causing the foot 68 to slide up over the pointed end of the arm 58 and again rest upon the rounded part 69, in which position the parts will be set for a subsequent operation of the device.

The means for operating the long arm 60 of the bell crank lever in order to bring the block 50 into engagement with the screw comprises parts as follows: Arranged upon the under-side of the shelf 25 and extending in a direction parallel to the arm 60 when the latter is in its normal position, and over-lapping the end of such long arm, is a sliding rack bar 75, the latter being longitudinally slotted near one end, as indicated at 76, to engage with a pin 78 fixed in the shelf, and having at its other end a pin 79 engaging with a similar slot 80 in the shelf. Along one edge of said rack bar are formed rack teeth 84 meshing with a pinion 85 on the lower end of a spindle 86 extending through and journaled in the shelf 25, the upper end of said spindle being provided with a rotative dial 88 and a knurled thumb wheel 89 similar to the dial of a safe, by means of which the spindle may be rotated to slide the rack bar 75 lengthwise along the underside of the shelf; a small mark 90 being made upon the shelf to indicate the correct setting of the dial as will be hereinafter explained. At the end of the rack bar 75 which overlaps the long arm 60 of the bell crank lever, and by means of the small pin 79, there is pivoted a T-shaped lever 92, the same comprising a head portion 93 which extends parallel to the arm 60 and immediately adjacent thereto; and a long arm 94 which extends beyond the edge of the shelf 25 and over the record disk in a tangential direction. The bracket 37 above described, which is secured to the sound box 23, is provided with an integral marginal extension in the form of a pointer 96 which is designed in the travel of the sound box to engage with the arm 94 and swing the same upon its pivot, whereupon the head portion 93 will push against the long arm 60 and rotate the bell crank lever about its pivot to bring the sliding block 50 toward the screw 32, and the latch 66 will operate to complete such movement and hold the parts together while further rotation of the screw will raise the inner end of the shelf 25 beneath the wheel 36 and thereby raise the sound box and its needle from the record disk; the inclining of the shelf being sufficient to cause the sound box, supported by its wheel 36, to roll downward along the shelf to the outer edge of the disk and in position for a repetition of the performance of the selection.

In order to insure positive operation of the parts at all times the screw 32 is made of such length as to raise the inner end of the shelf somewhat higher than may always be necessary to overcome the frictional and other resistance of the parts and cause the sound box to roll downward as above described; and after the sliding block 50 has engaged with the screw the shelf will continue to rise until the sharp edge of the block has reached the end of the threaded portion of the screw, at which point, by reason of the inclination of the shelf its projected length upon the record disk will have become shortened sufficiently to pull the block away from the screw and release the end of the shelf and allow it to fall back into its horizontal position; the block being then retained in such withdrawn position and ready for a subsequent operation by means of the latch 66 with its pointed toe resting upon the curved end of the arm 58 as shown in Fig. 2. It has been found that on different record disks the length of the engraving varies, and the inner ends of the engraved spiral lines may be at different distances from the centers of the disks. The rack-bar 75 with its connected parts is therefore provided in order to move the arm 94 inward and outward and to place it in the correct position to engage with the arm 96 on the sound box immediately after the latter has reached the end of the engraving, and not before; and the dial 88 is provided in order that after the correct setting for any given record disk is once obtained a corresponding figure may be marked upon such disk and the same setting again secured by simply turning the dial to the correct position without the necessity of closely examining the engraving upon the disk.

At the end of its outward travel upon the shelf 25 the sound box is arrested by means of a stop 100 which is also made adjustable to provide for record disks of different diameters. Such stop comprises a base plate 102 with its ends up-turned or flanged, as shown at 103 and 104, to provide supports for a sliding pin or bolt 105 which extends through openings in such flanges and is provided with flat circular heads, 106 and 107 respectively, at each end. Coiled compression springs 109, 109, are interposed between the circular heads at the ends of the sliding pin and the adjacent bearing flanges through which such pin passes in order to cushion and absorb the shock of the sound box striking against one of the ends of such sliding pin. The base plate 102 is pivoted upon the upper side of the shelf 25 by means of a small bolt 111 which passes through such plate nearer to one end than to the other in order that by turning it about such pivot point either its long end or its short end may be directed toward the center of the circular disk to accommodate the device to a small, or a large disk, respectively; the latter being ordinarily made in two different diameters. The lower end of the bolt 111 is provided with a nut as shown, and between such nut and the bottom of the shelf there is interposed a spring 113 to draw the bolt downward and cause frictional engagement between the plate 102 and the shelf 25; and a punched depression 115 in such base plate is also designed to engage with holes 117 in the shelf to maintain the adjustable parts in their correct setting. There is also provided below the shelf 25 means for arresting its fall when released from engagement with the screw 32, such means comprising a dash pot device in the form of a vertical cylinder 120 which is mounted upon the base flange 26 of the device, such cylinder being provided with a cylinder head 122 and having therein a piston 124 provided with a piston rod 125 which extends upward through an opening in the center of the cylinder head. The piston is made a loose fit within the cylinder and the latter may be filled with liquid such as glycerin or oil if desired. In operation the descending shelf 25 is retarded in its fall by the piston rod upon which it rests, the latter being retarded by the slow escape of air or liquid from the lower to the upper end of the cylinder. A coiled spring 128 acts to raise the piston when released from the weight of the shelf above.

Referring now to the selecting device for automatically selecting a pre-determined number of repetitions and then bringing the braking device into operation when desired, the same is arranged beneath the inclining shelf 25 and comprises a segmental shaped flat plate pivoted horizontally at its small end and free to move up and down at its other end in the manner of a pump handle.

Such segmental plate is spring-pressed upward but in each operation of the inclining shelf 25 is pushed downward by the weight of such shelf resting upon its upper edge. A pawl carried by the plate engages with a ratchet wheel to rotate the latter a small angular distance at each downward movement of the pawl; and such ratchet wheel is designed at the end of its rotative movement to actuate a braking device and arrest the rotation of the turn table 16. The determining of the desired number of repetitions is accomplished by setting the ratchet wheel a measured distance forward in its movement at the beginning of the operation; and the braking device is rendered inoperative to permit of an unlimited number of repetitions by allowing the pawl to rest upon a smooth place on the circumference of the ratchet wheel, the latter thus remaining stationary. These parts more particularly described are as follows: A flat vertical rectangular plate in the form of a wall 135 is arranged beneath one arm of the shelf 25 adjacent the hinged end of the latter and extending in a radial direction toward the circumference of the turn table 16, such plate being formed with an integral, horizontal, supporting base portion 136 by means of which it is secured upon the base plate 26 of the apparatus; and as here shown such horizontal base portion 136 likewise constitutes a support for the dash pot cylinder 120 above described.

Figures 8, 9, 11, 13:
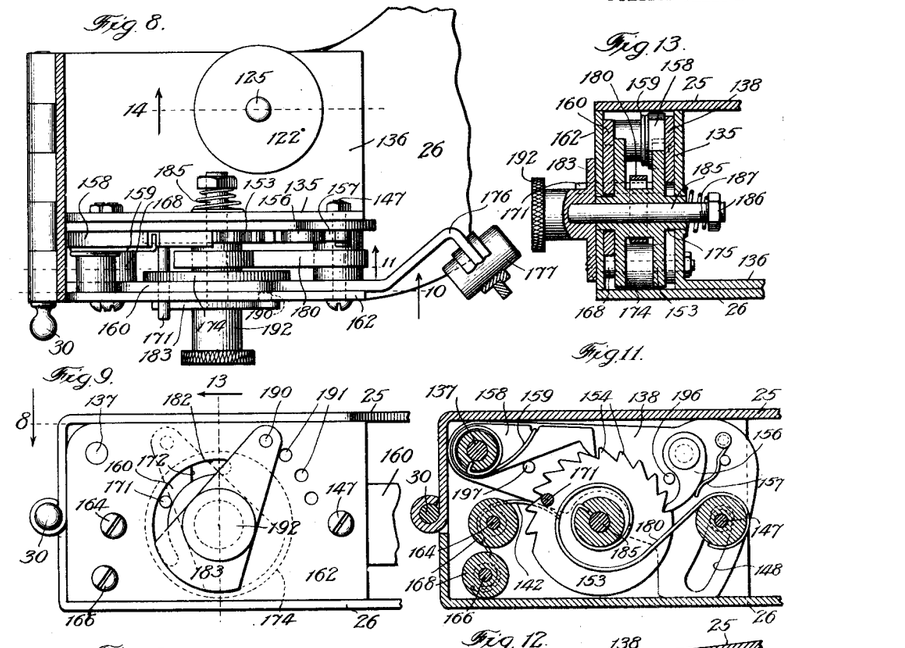
Fig. 8 is a view showing the selecting and braking mechanism arranged beneath the inclining shelf, being shown as a horizontal section taken on the line 8 of Fig. 9.
Fig. 9 is a view of the same parts in side elevation.
Fig. 11 is a similar section on the line 11 of Fig. 8.
Fig. 13 is a vertical section on the line 13 of Fig. 9.
Figure 10:
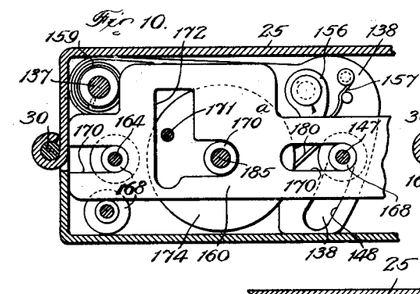
Fig. 10 is a vertical section on the line 10 of Fig. 8.
Figure 12:
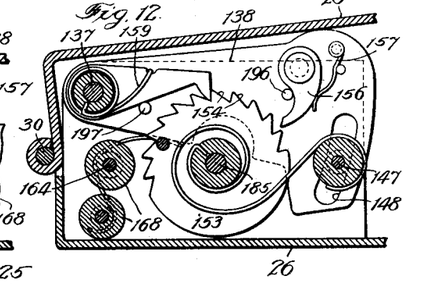
Fig. 12 is a view similar to Fig. 11 but showing the moving parts in an altered position with relation to each other.
Figure 14:
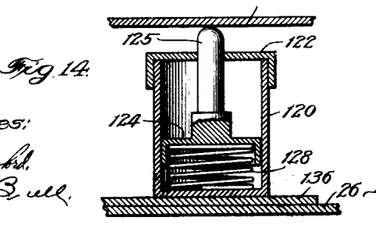
Fig. 14 is a vertical section on the line 14 of Fig. 8.

In the upper outer corner of the plate 135 is pivoted upon a horizontal pivot pin 137 the small end of the segmental shaped plate, 138, above referred to, the free end of such plate being of sufficient width to extend from the base plate 26 to the shelf 25 when the latter is in its horizontal position, thereby constituting a support for such shelf which rests upon its upper edge. A flat, curved spring 142 pressing upon the lower edge of the segmental plate 138 acts to push the latter upward at its free end, such upward movement being limited by means of a bolt 147 which extends through an arc-shaped slot 148 in the large end of the plate. It will be seen therefore that upon each upward movement of the shelf 25 the segmental plate 138 will be raised by the spring 142, and upon each downward movement of the shelf it will be again pushed downward by such shelf. Arranged with its plane parallel with and adjacent to the plane of the segmental plate 138 is a ratchet wheel 153 having in a part of its circumference ratchet teeth 154 which are designed to engage with a pawl 156 pivoted upon the plate 138 and pressed toward such ratchet wheel by means of a spring 157. A second pawl 158 is pivoted about the same axis as the plate 138, being mounted upon the shaft 137 above described, and is pressed downward and toward the ratchet wheel by means of a spring 159 thereby preventing the return movement of such ratchet wheel by the frictional engagement of the pawl 156 with its ratchet teeth. A large flat plate 160 is arranged to slide radially toward the turn table 16, being placed likewise parallel with the plane of the ratchet wheel 153 and confined between such ratchet wheel and a front cover plate or wall 162 which, together with the back plate 135, incloses the selecting mechanism; the two plates being secured together by means of bolts 164, 166, and the bolt 147 above described. The two bolts 164 and 166 also serve to maintain the spring 142 in place, as shown in Fig. 11, the spring being curved about the upper bolt and its lower end engaging with the lower one. The plate 160 is horizontally slotted, as shown at 170 and 170, and the bolts 164 and 147 pass through such slots, small spacing tubes 168, 168 being placed upon each bolt to properly space the two walls 135 and 162 apart and maintain them in parallel and rigid relation to each other. The plate 160 is also provided at about the center of its length with a horizontal slot through which extends one hub 170ª of the ratchet wheel 153 and such slot is continued upward at one end in the form of a large rectangular opening 172 through which extends a crank pin 171 projecting from the plane of the ratchet wheel. In order to better support the crank pin 171, the ratchet wheel 153, instead of comprising a single circular disk, is made spool-shaped, having a cylindric drum portion with integral circular heads at each end, one of them comprising the ratchet wheel 153, and the other being indicated at 174; and the spool-shaped member is extended at each end beyond such circular heads to form the hub 170ª, above designated, and a similar hub 175 at its other end. These hubs extend into circular openings through the front and back plate 162 and 135, respectively which thereby form bearings for the ratchet wheel. The circular disk 174 also furnishes lateral support for the sliding plate 160 which lies between it and the front wall 162, and the pin 171 fits tightly into an opening through the disk and is extended beyond its front face to engage in the opening through the sliding plate, as above described. In the rotation of the ratchet wheel the pin 171 engages in the vertical sides of the wide slot or opening 172 to move the sliding plate forward and backward, and the inner end of such plate is extended toward the turn table and bent to form a braking foot 176 having a circular opening therethrough through which is inserted a brake-shoe 177, the latter being conveniently made of wood, rubber or other frictional material and the opening through the brake-foot being threaded as shown in order to permit the brake-shoe to be adjusted with respect thereto. A flat, coiled spring 180 which is wound about the drum portion of the spool-shaped member 153 acts to rotate the latter in a counter-clockwise direction, as shown in Fig. 11, this direction carrying the pin 171 away from the turn table and acting to withdraw the brake-shoe from engagement with the circular plate, such pin extending through a curved slot 182 in the plate 162 and such counter-clockwise rotation of the disk 153 being limited either by the lower end of such slot or by a triangular cover plate 183 which may be adjusted to partially cover such slot, according to the desired operation of the parts. The triangular adjusting plate 183 is fixed on the end of a shaft 185 which extends entirely through the spool-shaped member 153 and is provided at its rear end with a nut 186 and also with a spring 187 interposed between such nut and the back plate 135 to press the plate 183 into yielding contact with the plate 162. A pin 190 fixed in the apex of the triangular plate 183 is designed to engage with holes 191, 191 arranged in the plate 162 in an arc about the axis 185 and the triangular plate is also provided with a knurled hand wheel 192 by means of which it may be rotated and adjusted in such position as to cover a part of the curved slot 182 of more or less extent, thereby limiting the travel of the pin 171 in such slot, or, if desired, to entirely uncover such slot, as indicated by its dotted outline in Fig. 9. Pins 196 and 197 projecting from the segmental plate 138 limit the inward movement of the pawls 156 and 158 for a purpose which will be hereinafter explained.

The operation of the device is as follows: When the shelf 25 is lifted the necessary distance to place a record disk upon the instrument the plate 138 will spring upward as far as will be permitted by the slot 148 and this movement will disengage both the pawls 156 and 158 from the ratchet teeth and allow the pin 171 to be rotated backward in its curved slot as far as is permitted by the adjusting plate 183; or entirely to the end of such slot according to the pre-arranged setting of the device. The graphophone instrument is then set in operation in the usual manner and at the end of the performance of the selection the inclining shelf 25 will operate as above described to return the sound box to its original position at the circumference of the disk, whereupon, again descending, the shelf 25 will push the triangular supporting plate 138 downward; and at the same time the sound box will be set upon the record disk, and, the latter rotating, the spring pressed stop 100 will urge it inward until its needle engages with the spiral grooves and continues the sound box upon its journey over the disk. In the event that the dial plate 183 has been set to entirely uncover the curved slot 182 and allow the ratchet wheel to rotate backward to the farthest extent permitted by such slot, the pawl 156 will engage with the smooth circumference of the ratchet wheel beyond the toothed portion thereof and will slide upon the latter without rotating it, whereby this part of the device will remain inoperative and continued repetitions will occur. If however, the adjusting plate 183 has been set in a position covering a portion of such slot the position of the ratchet wheel 153 will be correspondingly changed so that the descending pawl 156 will engage with one of the ratchet teeth and rotate the ratchet wheel the distance of its travel; the operation being repeated until the pin 171 has been rotated a sufficient distance to engage with the forward vertical wall of the slot 172 in the sliding plate 160 and press the brake-shoe into engagement with the circular plate 16 to arrest the rotation of the latter. For a succeeding operation of the graphophone instrument the shelf 25 is again lifted, permitting the plate 138 to spring its full distance upward and free the ratchet wheel as before; and if a different number of repetitions is desired for such succeeding operation the adjusting plate 183 is rotated by hand into another one of its positions, which will alter the distance of travel of the pin 144 before engaging with the sliding plate to actuate the braking device.

I claim as my invention:

1. The combination with a sound-reproducing instrument including a sound box, and a rotating table, of a shelf arranged below the path of travel of said sound box, a screw fixed to said rotating table and rotated thereby, a member carried by said shelf for engaging with said screw, a part extending from said shelf over said record disk and adapted for engagement with said sound box in the travel of the latter, and means acting through the movement of such part to bring said screw engaging member into engagement with such screw and incline said shelf.

2. The combination with a sound-reproducing instrument including a rotating table, of a horizontal shelf arranged above said rotating table, means for detachably securing said shelf to the instrument, a screw carried by said rotating table and rotated thereby, a movable member secured to said shelf for engaging with said screw, a lever extending from said shelf to engage with the sound box in the travel of the latter, and means for transmitting the movement of said lever to the movable member in said shelf.

3. The combination with a sound-reproducing instrument including a rotating table, of a horizontal shelf arranged above said rotating table, means for detachably securing said shelf to the instrument, a screw carried by said rotating table and rotated thereby, a movable member secured to said shelf for engaging with said screw, a lever extending from said shelf to engage with the sound box in the travel of the latter, and means for transmitting the movement of said lever to the movable member in said shelf, said lever being adjustable with respect to a radius of said rotating table.

4. The combination with a sound-reproducing instrument including a sound box, and a rotating table, of a shelf arranged above said rotating table, a sliding block in the end of said shelf, a pivoted lever for moving said block, said lever having a cam-shaped portion, and a latch engaging with said cam-shaped portion to yieldingly maintain said sliding block in one of its positions.

5. The combination with a sound-reproducing instrument including a sound box, and a rotating table, of a shelf arranged above said rotating table, a sliding block in the end of said shelf, a pivoted lever for actuating said sliding block, and another lever extending over the record disk and engaging with said first lever.

6. The combination with a sound-reproducing instrument including a sound box, and a rotating table, of a shelf arranged above said rotating table, a sliding block in the end of said shelf, a pivoted lever for actuating said sliding block, and another lever extending over the rotating table and engaging with said first lever, the said second mentioned lever being adjustable with respect to a radius of said rotating table.

7. The combination with a sound-reproducing instrument including a sound box, and a rotating table, of a shelf arranged above said rotating table, a sliding block in the end of said shelf, a pivoted lever for actuating said sliding block, another lever extending over the rotating table and engaging with said first lever, a rack bar to which said second mentioned lever is secured, a pinion engaging therewith, and indicating means for determining the correct setting of said rack bar.

8. The combination with a sound-reproducing instrument including a sound box, and a rotating table, of a shelf extending over said rotating table, means for inclining said shelf, a movable member below said shelf, means for yieldingly pressing said member upward, said member being pressed downward in each downward movement of said shelf by the weight thereof, means operated by the reciprocal movements of said member for arresting the operation of the sound-reproducing instrument, and means for selecting a pre-determined number of operations of said member before bringing said arresting device into operation.

9. The combination with a sound-reproducing instrument including a sound box, and a rotating table, of a shelf extending over said rotating table, means for inclining said shelf, a movable member below said shelf, means for yieldingly pressing said member upward, said member being pressed downward in each downward movement of said shelf by the weight thereof, means operated by the reciprocal movements of said member for arresting the operation of the sound-reproducing instrument, said means including a ratchet wheel having a part of its circumference smooth and a pawl carried by said movable member for engaging with said ratchet wheel, and means for causing said ratchet wheel to assume a position with said pawl resting upon the smooth part of the circumference.

10. The combination with a sound-reproducing instrument including a sound box, and a rotating table, of a shelf extending above the rotating table, means for inclining said shelf, and means actuated by the weight thereof to arrest the operation of the instrument, said means including a sliding member having a brake-foot carrying a brake-shoe, and said shoe being adjustable with respect to said foot.

11. The combination with a sound-reproducing instrument, of an inclining shelf, a yielding member below said shelf adapted for downward movement by the weight of said shelf resting upon it, means for returning said member upward when such weight is removed, a pawl carried by said member, a ratchet wheel for engagement therewith, a braking device operated by the movement of said ratchet wheel, and means for setting said ratchet wheel a pre-determined distance forward upon its travel at the beginning of each operation.

12. The combination with a sound-reproducing instrument, of an inclining sh a rising and falling member downwa. lly pressed by the weight of said shelf, means for yieldingly pressing said member upward, a pawl carried by said member, and a ratchet wheel for engagement therewith, said pawl being adapted for disengagement from said ratchet wheel in the upward movement of said member to its farthest extent.

13. The combination with a sound-reproducing instrument, of a braking device comprising a ratchet wheel having a smooth place on its circumference, a movable member having a pawl for engagement with said ratchet wheel to rotate the same, means for yieldingly rotating said ratchet wheel in a reverse direction, and means for permitting the latter to rotate in such reverse direction the required distance to bring such pawl upon such smooth place.

14. The combination with a sound-reproducing instrument, of a braking device comprising a ratchet wheel, a movable pawl for rotating the same, means for yieldingly rotating said ratchet wheel in a reverse direction, a curved slot and a pin carried by said ratchet wheel and entering said slot for limiting the rotation of said ratchet wheel, and means for covering an end of said slot to limit the distance of travel of said pin, or for uncovering such end to permit the pin to travel to its farthest extent toward such end.

In witness whereof, I have hereunto subscribed my name in the presence of two witnesses this 1st day of June, A. D. 1912.

BEN R. SMITH.

Witnesses:
　FLORENCE McCULLOCH,
　THOMAS E. D. BRADLEY.